(12) United States Patent
Fredl

(10) Patent No.: US 6,436,322 B1
(45) Date of Patent: Aug. 20, 2002

(54) METHOD FOR RECYCLING PET FLAKES

(75) Inventor: Rüdiger Fredl, Limburg (DE)

(73) Assignee: Ohl Apparatebau & Verfahrenstechnik GmbH, Limburg (DE)

(*) Notice: Subject to any disclaimer, the term of this patent is extended or adjusted under 35 U.S.C. 154(b) by 0 days.

(21) Appl. No.: 09/381,145
(22) PCT Filed: Feb. 17, 1998
(86) PCT No.: PCT/DE98/00459
  § 371 (c)(1),
  (2), (4) Date: Dec. 27, 1999
(87) PCT Pub. No.: WO98/40194
  PCT Pub. Date: Sep. 17, 1998

(30) Foreign Application Priority Data

Dec. 3, 1997 (DE) .......................... 197 10 098

(51) Int. Cl.[7] .............................. B29C 47/00
(52) U.S. Cl. .................. 264/85; 264/101; 264/141; 264/571; 264/920
(58) Field of Search .................. 264/85, 101, 102, 264/920, 141, 142, 140, 571

(56) References Cited

U.S. PATENT DOCUMENTS

| | | | |
|---|---|---|---|
| 3,804,811 A | * | 4/1974 | Rose et al. |
| 4,255,295 A | * | 3/1981 | Regnault et al. |
| 4,483,949 A | * | 11/1984 | Seme et al. |
| 5,266,124 A | * | 11/1993 | Al-Jumah et al. |
| 5,597,891 A | * | 1/1997 | Nelson et al. |
| 5,731,389 A | * | 3/1998 | Bailly et al. |
| 5,807,932 A | * | 9/1998 | Pfaender et al. |
| 5,876,644 A | * | 3/1999 | Nichols et al. |
| 5,945,460 A | * | 8/1999 | Ekart et al. |
| 6,020,056 A | * | 2/2000 | Walker et al. |
| 6,217,804 B1 | * | 4/2001 | Lieberman |
| 6,284,866 B1 | * | 9/2001 | Schiavone |

OTHER PUBLICATIONS

Pfeiffer Vacuum, "Vacuum Pumping Station for Extruders", www.pfeiffer-vacuum.com/rootsapplnts.html.*

* cited by examiner

Primary Examiner—Mark Eashoo
(74) Attorney, Agent, or Firm—Max Fogiel

(57) ABSTRACT

The invention relates to a method for recycling polyethylene terephtalate (PET) flakes, characterized in that the flakes are extruded and granulated under vacuum, after which the granulate is aftercondensed in a solid phase under vacuum. Extrusion is preferably carried out in differentiated vent zones and aftercondensation of the solid phase is dependent on temperature, vacuum and time spent in a tumble dryer. Said dryer ensures the even and careful mixing and constant viscosity of the PET product. Said method is used in particular for making PET beverage bottles.

18 Claims, 1 Drawing Sheet

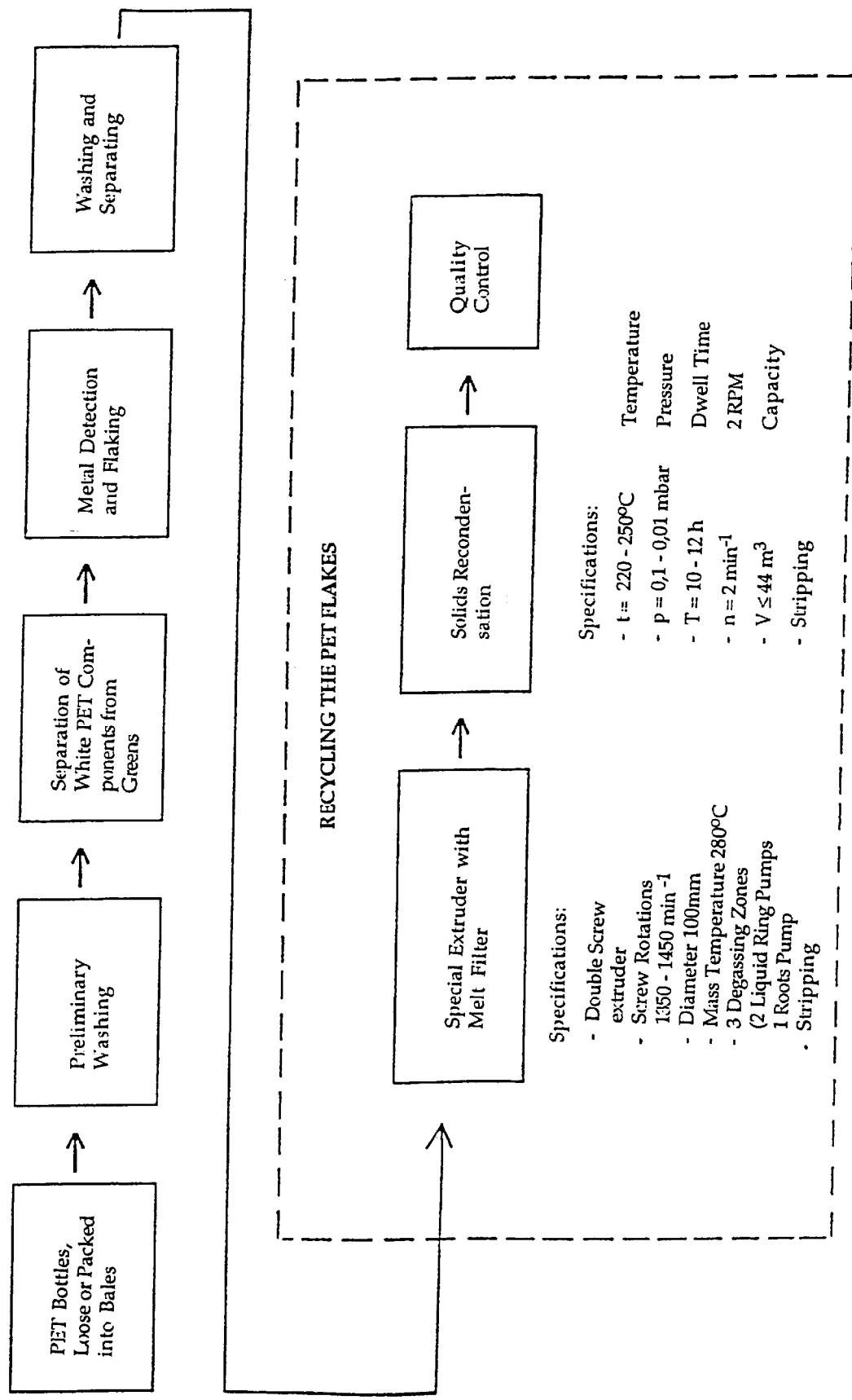

METHOD FOR RECYCLING PET FLAKES

BACKGROUND OF THE INVENTION

The present invention concerns, first, a method of producing polyethylene-terephthalate (PET) recyclate from flake, and, second, a product thereof.

PET products are widely used, as beverage bottles, for high-grade sheet and fibers, and in medical supplies, especially syringes and containers for instance. Attempts have been made to include the material in the recycling process as far as possible, but so far without avail in that it has been impossible to entirely decompose an residual contaminants in the product. The current commercially employed methods allow the use of PET recyclate only in applications with low-grade demands. Where higher quality is required, as in the manufacture of bottles, a little recycled PET may be blended with a lot more of the non-recycled material. Bottles with tri-laminate walls are also known, the innermost layer blown from non-recycled PET and the core made of the recycled material.

When PET products have to be made entirely of recyclate, the material must contain acetaldehyde, if indeed at all, in the ppm (mg/kg) range. Flake obtained from PET products in the laboratory are contaminated, with 1,1,1-trichloroethane, toluene, clorobenzene, phenyl cyclohexane, and benzophenone. These contaminants must be eliminated or entirely decomposed during the recycling process.

A method of preparing thermally stressed polyester waste for re-use in the production of high-quality PET's is known from German 4 034 459 A1. The waste is chopped, cleaned, sorted, and recondensed. The chips are melted and the melt is filtered, cooled, and granulated. The solid granulate is recondensed to increase its molecular mass. The condensed granulate is forwarded to an extruder and extruded along with previously unused raw material into sheet, sections, or billets. The solid phase is condensed in a tumble drier at a vacuum of 0.1 mbar for approximately 12 hours at 200–250° C. Essential to this method is the re-use of polyester waste from various sources, and the usual loss of mechanical and optical properties can be extensively compensated by the recondensation. The polyester waste is cleaned by filtering out contaminant particles of at least 5 to [TEXT MISSING?—Translator] $\mu$m in size and by recondensing the solids in a vacuum. Still, this method cannot be applied to the production of PET recyclate without the addition of considerable previously unused raw material if it is to be used as a single starting material for a product that is to come into direct contact with foodstuffs.

SUMMARY OF THE INVENTION

One object of the present invention is accordingly a method of producing from contaminated flake polyethylene-terephthalate (PET) recyclate containing acetaldehyde, if any, only in the ppm (mg/kg) range.

This object is attained in accordance with the present invention in a generic method in that the flake is extruded and granulated in a vacuum and the solids then recondensed in a vacuum.

Extruding plastics and treating them by recondensation, of the solids for example, is basically known. Essential to the present invention, however, is the combination of the two procedures to produce PET recyclate. The method in accordance with the present invention is in two steps. In the first, the flake is extruded, eliminating most of the volatile byproducts, acetaldehyde and oligomers for instance. Extrusion and granulation are carried out first to provide the intermediate product with a well-defined shape and size and to ensure a relatively uniform viscosity. The following step, recondensation of the solids in a vacuum, will decompose almost all the remaining contaminants, and the result can be directly employed as a recycled starting material for the manufacture of products from PET. It will no longer be necessary to mix the recyclate with freshly compounded PET. The recyclate will itself alone be appropriate for manufacturing products that come into direct contact with foodstuffs.

In one embodiment of the method in accordance with the present invention, the preparation of the granulate from the flake and/or the subsequent treatment of the granulate is accompanied by stripping. An inert gas, nitrogen for instance, and/or steam is accordingly homogeneously injected to create a larger surface. The volatile byproducts, the contaminants, will distribute themselves more uniformly and can then be optimally eliminated.

The flake is preferably extruded and granulated in an extruder with a screw, or preferably with two screws, with differentiated gas-venting sections. Three gas-venting sections can in particular be employed. It is of advantage to generate the vacuums in the two upstream gas-venting sections with liquid-circulating pumps and the vacuum in the third section with a Roots pump. This approach ensures an especially low level of pressure in the final gas-venting section.

The solids can be recondensed below the granulate's melting point, and especially at 220–250° C. They can be recondensed at a pressure of 0.1–0.01 mbar. The recondensation can in particular take 10 to 12 hours. In one particular embodiment of the present invention, the solids in the granulate are recondensed in a rotating drum, especially a tumble drier. The drum can in particular operate at 1 to 5 and especially at 2 rpm, ensuring gentle and uniform blending of the granulate at a prescribed viscosity, which is of decisive significance for attaining the desired parameters in the finished PET.

The particular field of application of the method in accordance with the present invention is the economical recycling of PET beverage bottles to the extent that they can be considered a raw product 100% returnable to the production process. It is for example conceivable for the process to produce high-grade plastic sheet and fiber and PET medical supplies.

The method of recycling in accordance with the present invention will now be described with the ppm-free and acetaldehyde-free recovery of PET beverage bottles as an example. Returned-empty bottles are recovered, compacted, sorted, washed, peripherally treated in various ways, and ground up into flake, which represents the starting material for the method in accordance with the present invention. The flake is extruded, stripped, and granulated at the prescribed temperature range in an extruder with screws and differentiated gasventing sections and corresponding vacuums of the configuration hereintofore described. Most of the volatile byproducts are eliminate during this step. Any contaminants remaining in the product are entirely decomposed by the solids recondensation and stripping that characterize the method. The granulate is provided in accordance with the temperature, vacuum, processing duration, and stripping with the characteristics required for PET-bottle production in a tumble drier with accessories appropriate for ensuring uniform blending and constant viscosity.

BRIEF DESCRIPTION OF THE DRAWINGS

The method in accordance with the present invention will now be specified with reference to the attached drawing, the sole FIGURE wherein is a block diagram representing the various steps involved in the method in accordance with the present invention with PET bottles as a concrete example from separation of the used bottles to recycling of the flake recycled therefrom.

DESCRIPTION OF THE PREFERRED EMBODIMENTS

Recovered PET bottles are delivered loose or packed in bales. The bottles are preliminarily washed, and the clear whites separated from the greens. Objects of metal are detected and removed. The bottles are then ground into flake. The flake is washed and separated, any metal components being removed from the mixture. Since washing the bottles and then the flake has already removed a considerable portion of the contaminants, only those that actually adhere to the material will be carried into the downstream recycling process.

The washed flake is forwarded to a special extruder with a melt filter. This device is two-screw extruder operating at 1350 to 1450 rpm. The screws can be 200 mm in diameter for example. The extruder includes three gas-venting sections, the two upstream provided each with a liquid-circulating pump and the third section with a Roots pump. As it travels through the extruder, the mass of PET is heated to 280° C. for example. The mass is simultaneously stripped by the homogeneously distributed injection of an inert gas, nitrogen for instance, and/or steam. As the granulate leaves the extruder, it is subjected to solids recondensation and stripping to increase its viscosity. This procedure is a prerequisite for blowing new bottles from the mass, which can be done only within a narrow range of viscosity. The granulate is processed in a tumble drier, discontinuously, that is. The mass is blended in the drier for a prescribed duration, particularly 10 to 12 hours. The advantage of this batch-by-batch system is that bottles from various manufacturers and accordingly of varying viscosity can be recycled. The long-lasting mixing ensures that the viscosity of the blend can be adjusted to a prescribed level. Batchwise recondensation of the solids is economically justified by the scale of the system. The drum can have a capacity of 44 m3 for example. The material is recondensed at 220 to 250° C., temperatures sufficiently remote from the granulate's melting point. The drum rotates slowly, at 2 rpm for example, and is pressurized to 0.1–0.01 mbar.

Solids recondensation is followed by quality control of the recycled flake.

Tests of flake contaminated with up to 1000 mg/kg of toluene, chlorobenzene, phenyl cyclohexane, and benzophenyl have revealed the recondensed final product to contain only ppm (mg/kg) of acetaldehyde if any.

Legend to Figure

PET bottles, loose or packed into bales
Preliminary washing
Separation of white PET components from greens
Metal detection and flaking
Washing and separation
RECYCLING THE PET FLAKE
Special extruder with melt filter
Solids recondensation
Quality control
Specifications
Two-screw extruder
1350–1450 wpm
Extruder 100 mm in diameter
Mass at 280° C.
Three gas-venting sections
Two liquid-circulating pumps and one roots pump
Stripping
Temperature 220–250° C.
Pressure 0.1–00.1 mbar
Dwell time 10–12 hours
2 rpm
Capacity<44 m3
Stripping

I claim:

1. A method for producing PET recyclate from flake, comprising the steps of: extruding and granulating the flake; recondensing solids of the granulate in a vacuum and stripping by homogeneously distributes injection of an inert gas; said extruding step being carried out in a vacuum and the stripping in an extruder with screw means with three differentiated gas-venting sections, vacuums in two of said gas-venting sections being generated upstream with liquid-circulating pumps and the vacuum in the third section being generated with a Roots pump.

2. A method as defined in claim 1, wherein the solids are recondensed below the granulate's melting point, at 220–250° C.

3. A method as defined in claim 1, wherein the solids are recondensed at 0.1 to 0.01 mbar.

4. A method for producing polyethylene-terephthalate (PET) recyclate only from flake, comprising the steps of: extruding and granulating the flake in a vacuum; and recondensing the extruded and granulated flake in form of solids in a vacuum; stripping the recondensed extruded and granulated flake for decontamination by injecting an inert gas in a homogeneous distribution, said extruding step being carried out by a double screw extruder with three differentiated gas-venting sections; generating a vacuum in two of said gas-venting sections by liquid circulating pumps; and generating a vacuum in the third gas-venting section by a rotary piston pump; said vacuum in said third section being lower than the vacuum in said two sections for decontaminating the recyclate and permit direct contact with food substance; said recyclate being free of nonrecycled PET.

5. A method as defined in claim 4, wherein the flake is extruded, stripped, and granulated in a vacuum.

6. A method as defined in claim 4, wherein said granulating step is followed by said recondensing step in a vacuum and by stripping.

7. A method as defined in claim 4, wherein vacuums are generated in two upstream of said gas-venting sections with liquid-circulating pumps and vacuum is generated in the third section with a Roots pump.

8. A method as defined in claim 4, wherein said solids are recondensed substantially at 220–250° C.

9. A method as defined in claim 4, wherein said solids can be recondensed at a pressure of 0.1–0.01 mbar.

10. A method as defined in claim 4, wherein said recondensing step takes 10 to 12 hours.

11. A method as defined in claim 4, wherein said solids are recondensed in a rotating drum.

12. A method as defined in claim 11, wherein said drum operates at 1 to 5 rpm.

13. A method as defined in claim 4, wherein said solids are recondensed in a tumble drier.

14. A method as defined in claim 4, wherein said flake is produced from PET beverage bottles.

15. A method as defined in claim 4, including the step of adding PET recyclate to manufacture high-grade sheet and fibers, medical supplies, syringes and containers, and beverage bottles.

16. A method as defined in claim 4, wherein a PET bottle is produced from only PET recyclate.

17. A method as defined in claim 16, wherein said PET recyclate is produced only from returned PET beverage bottles.

18. A method for producing polyethylene-terephthalate (PET) recyclate only from flake, comprising the steps of: extruding and granulating the flake in a vacuum; and recondensing the extruded and granulated flake in form of solids in a vacuum; stripping the recondensed extruded and granulated flake for decontamination by injecting an inert gas in a homogeneous distribution, said extruding step being carried out by a double screw extruder with three differentiated gas-venting sections; generating a vacuum in two of said gas-venting sections by liquid circulating pumps; and generating a vacuum in the third gas-venting section by a rotary piston pump; said vacuum in said third section being lower than the vacuum in said two sections for decontaminating the recyclate and permit direct contact with food substance; said recyclate being free of nonrecycled PET; said flake being extruded, stripped, and granulated in a vacuum; said granulating step being followed by said recondensing step in a vacuum and by stripping; vacuums being generated in two upstream of said gas-venting sections with liquid-circulating pumps and vacuum being generated in the third section with a Roots pump; said solids being recondensed at substantially 220–250° C.; said solids being recondensed at a pressure of 0.1–0.01 mbar; said recondensing step taking 10 to 12 hours; said solids being recondensed in a rotating drum; said drum operating at 1 to 5 rpm; said PET flake being produced from PET beverage bottles; said PET recyclate being produced only from returned PET beverage bottles.

\* \* \* \* \*